(12) United States Patent
Chen

(10) Patent No.: US 9,716,767 B2
(45) Date of Patent: Jul. 25, 2017

(54) METHOD, SYSTEM, COMPUTER STORAGE MEDIUM, AND APPARATUS FOR PUSHING INPUT RESOURCES

(71) Applicant: BAIDU ONLINE NETWORK TECHNOLOGY (BEIJING) CO., LTD., Beijing (CN)

(72) Inventor: Long Chen, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 15/123,136

(22) PCT Filed: Aug. 29, 2014

(86) PCT No.: PCT/CN2014/085483
§ 371 (c)(1),
(2) Date: Sep. 1, 2016

(87) PCT Pub. No.: WO2015/131510
PCT Pub. Date: Sep. 11, 2015

(65) Prior Publication Data
US 2017/0078425 A1 Mar. 16, 2017

(30) Foreign Application Priority Data
Mar. 3, 2014 (CN) .......................... 2014 1 0074872

(51) Int. Cl.
*G06F 15/16* (2006.01)
*H04L 29/08* (2006.01)
(Continued)

(52) U.S. Cl.
CPC ............ *H04L 67/26* (2013.01); *G06F 17/211* (2013.01); *G06F 17/30867* (2013.01); *H04L 67/42* (2013.01)

(58) Field of Classification Search
CPC ....................................................... H04L 67/26
(Continued)

(56) References Cited

U.S. PATENT DOCUMENTS 9,332,380 B2  5/2016  Fu
9,384,244 B1*  7/2016  Garg ................. G06F 17/30864
(Continued)

FOREIGN PATENT DOCUMENTS

CN  101645065 A  2/2010
CN  103455160 A  12/2013
(Continued)

*Primary Examiner* — Philip B Tran
(74) *Attorney, Agent, or Firm* — Seed IP Law Group LLP

(57) ABSTRACT

The embodiments of the invention provide a method for pushing input resources, comprising: obtaining user characteristic information in a client terminal, the user characteristic information including user interest information or user position information; obtaining at least one input resource based on the user characteristic information; the input resources including at least one of input method skin, input method font, and input method font size; pushing the at least one input method resource to the client terminal. The embodiments of the invention further provide a system for pushing input resources. The technical solutions of the embodiments of the invention can easily and conveniently achieve replacement of input resources.

12 Claims, 2 Drawing Sheets

(51) Int. Cl.
  *G06F 17/30*  (2006.01)
  *G06F 17/21*  (2006.01)
  *H04L 29/06*  (2006.01)
(58) Field of Classification Search
  USPC .......................................................... 709/217
  See application file for complete search history.

(56) References Cited

U.S. PATENT DOCUMENTS

| | | | |
|---|---|---|---|
| 2005/0234953 A1* | 10/2005 | Zhang | G06F 17/30663 |
| 2010/0082673 A1* | 4/2010 | Nakano | G06F 17/3089 |
| | | | 707/776 |
| 2014/0129580 A1* | 5/2014 | Xiao | G06F 17/30386 |
| | | | 707/758 |
| 2014/0136970 A1* | 5/2014 | Xiao | G06F 17/24 |
| | | | 715/271 |
| 2015/0220660 A1* | 8/2015 | Yang | G06F 17/30867 |
| | | | 707/723 |

FOREIGN PATENT DOCUMENTS

| | | |
|---|---|---|
| CN | 103473036 A | 12/2013 |
| CN | 103870553 A | 6/2014 |
| JP | 2006-4054 A | 1/2003 |
| JP | 2011-215758 A | 10/2011 |

\* cited by examiner

METHOD, SYSTEM, COMPUTER STORAGE MEDIUM, AND APPARATUS FOR PUSHING INPUT RESOURCES

This application claims the priority of the Chinese patent application filed on Mar. 3, 2014, with the Application No. 201410074872.2, and titled as "A Method and System for Pushing Input Resources".

TECHNICAL FIELD

The present invention relates to network application, and more particularly to a method, system, computer storage medium, and apparatus for pushing input resources.

BACKGROUND

Input methods are commonly used tools to users. Currently, most input methods come with a lot of auxiliary functions. For example, input method replacement, weather inquiry, quick blogging, small dictionary, screen shot, network station, etc. In these functions, input resources, such as input method skins, can beautify the input interface; on the other hand, different input resources can characterize user features, such as the user's interest and hobbies. Accordingly, the function of replacing input resources has been accepted by users, and is widely used, becoming preferred function of users and one of the important functions of an input method.

Nevertheless, in the current input methods, if a user replaces an input resource, for example, replacing the input method skin, the user needs to log into the official web site of the input method, browse the pictures of a variety of input method skins, choose his favorite input method skin, download the input method skin installation files to the local terminal, and run the installation files of the input method skin, so as to have the input method skin installed locally. Accordingly, the replacement of input resources is complicated, which increases the cost of running the system in the terminal, and results in low efficiency of the system.

SUMMARY

In view of this, the embodiment of the invention provide a method and system for pushing input resources, which can easily and conveniently achieve replacement of input resources.

Embodiments of the invention provide a method for pushing input resources, comprising:

obtaining user characteristic information in a client terminal, the user characteristic information including user interest information or user position information;

obtaining at least one input resource based on the user characteristic information; the input resources including at least one of input method skin, input method font, and input method font size;

pushing the at least one input method resource to the client terminal.

In the above method, the user characteristic information is user interest information, the step of obtaining user characteristic information in a client terminal comprises:

obtaining at least one on-screen word entry of the client terminal;

obtaining word frequency information of the at least one on-screen word entry;

obtaining at least one target word entry based on the at least one on-screen word entry, the word frequency information of the at least one on-screen word entry, and a preset frequency threshold;

obtaining the user interest information of the client terminal according to the at least one target word entry and a preset category dictionary.

In the above method, the category dictionary includes at least one interest category and at least one word entry included in each interest category; the step of obtaining the user interest information of the client terminal according to the at least one target word entry and a preset category dictionary comprises:

carrying out matching among all word entries in the category dictionary according to each target word entry;

if there exists a word entry that matches with the target word entry, increasing the corresponding weight value of the interest category the word entry belongs to by 1; if there is no word entry that matches with the target word entry, obtaining a co-occurring word entry of the target word entry with the largest number of co-occurrences; carrying out matching among all word entries in the category dictionary according to the co-occurring word entry with the largest number of co-occurrences; increasing the corresponding weight value of the interest category the co-occurring entry belongs to by 1;

obtaining user interest information of the client terminal based on at least one interest category with the largest weight value.

In the above method, the user characteristic information is user position information, the step of obtaining user characteristic information in a client terminal comprises:

obtaining at least one piece of candidate position information of the client terminal;

obtaining the number of occurrences of the at least one piece of candidate position information based on the at least one piece of candidate position information;

obtaining at least one piece of target position information based on the at least one piece of candidate position information, the number of occurrences of the at least one piece of candidate position information, and a preset probability threshold;

obtaining the user positioning information of the client terminal based on the at least one piece of target position information.

In the above method, the step of obtaining at least one input resource based on the user characteristic information comprises:

obtaining at least one candidate input resource associated with the user characteristic information;

randomly selecting at least one input resource from the at least one candidate input resource; or, obtaining at least one input resource from the at least one candidate input resource based on at least one candidate input resource with the most recent update time; or, obtaining at least one input resource from the at least one candidate input resource based on at least one candidate input resource with the highest user rating.

Embodiments of the invention provide a system for pushing input resources, comprising:

a characteristic processing unit, for obtaining user characteristic information in a client terminal, the user characteristic information including user interest information or user position information;

a resource processing unit, for obtaining at least one input resource based on the user characteristic information; the input resources including at least one of input method skin, input method font, and input method font size;

a resource output unit, for pushing the at least one input resource to the client terminal.

In the above system, the user characteristic information is user interest information, the characteristic processing unit is specifically used for:

obtaining at least one on-screen word entry of the client terminal;

obtaining word frequency information of the at least one on-screen word entry;

obtaining at least one target word entry based on the at least one on-screen word entry, the word frequency information of the at least one on-screen word entry, and a preset frequency threshold;

obtaining the user interest information of the client terminal according to the at least one target word entry and a preset category dictionary.

In the above system, the category dictionary includes at least one interest category and at least one word entry included in each interest category; the characteristic processing unit is specifically used for:

carrying out matching among all word entries in the category dictionary according to each target word entry;

if there exists a word entry that matches with the target word entry, increasing the corresponding weight value of the interest category the word entry belongs to by 1; if there is no word entry that matches with the target word entry, obtaining a co-occurring word entry of the target word entry with the largest number of co-occurrences; carrying out matching among all word entries in the category dictionary according to the co-occurring word entry; increasing the corresponding weight value of the interest category the co-occurring entry belongs to by 1;

obtaining the user interest information of the client terminal based on at least one interest category with the largest weight value.

In the above system, the user characteristic information is user position information, the characteristic processing unit is specifically used for:

obtaining at least one piece of candidate position information of the client terminal;

obtaining the number of occurrences of the at least one piece of candidate position information;

obtaining at least one piece of target position information based on the at least one piece of candidate position information, the number of occurrences of the at least one piece of candidate position information, and a preset probability threshold;

obtaining the user positioning information of the client terminal based on the at least one piece of target position information.

In the above system, the resource processing unit is specifically used for:

obtaining at least one candidate input resource associated with the user characteristic information;

randomly selecting at least one input resource from the at least one candidate input resource; or obtaining at least one input resource from the at least one candidate input resource based on at least one candidate input resource with the most recent update time; or, obtaining at least one input resource from the at least one candidate input resource based on at least one candidate input resource with the highest user rating.

Embodiments of the present invention further provide a computer storage medium, coded with computer programs, when executed by one or more computers, the programs make the one or more computers execute the following operations:

obtaining user characteristic information in a client terminal, the user characteristic information including user interest information or user position information;

obtaining at least one input resource based on the user characteristic information; the input resources including at least one of input method skin, input method font, and input method font size;

pushing the at least one input method resource to the client terminal.

Embodiments of the present invention further provide an apparatus, comprising at least on processor, memory, and at least one computer program; the at least one computer program being stored in the memory and executed with the at least one processor; wherein the computer programs comprises instructions executing the following operations:

obtaining user characteristic information in a client terminal, the user characteristic information including user interest information or user position information;

obtaining at least one input resource based on the user characteristic information; the input resources including at least one of input method skin, input method font, and input method font size;

pushing the at least one input method resource to the client terminal.

For the above technical solutions, the embodiments of the invention have the following beneficial effects:

It is possible to obtain, based on the obtained user characteristic information such as user interest information or user position information, input resources, such as input method skin, input method font, or input method font size, and then to push the obtained resources to the user. Different from the prior art, the present invention can timely obtain input resources, reduce the cost of system running in the terminal, improve the system efficiency, and make the server to do intelligent pushing of input sources.

BRIEF DESCRIPTION OF DRAWINGS

In order to more clearly illustrate the technical solutions of the embodiments of the present invention, the drawings used for description of the embodiments will be briefly described; as is obvious, the drawings described below refer to some embodiments of the invention, those of ordinary skills can, without creative efforts, also obtain other drawings based on these drawings.

DETAILED DESCRIPTION

For better understanding of the technical solutions of the present invention, the embodiments of the invention will be described below in detail with references to drawings.

It should be clear that the described embodiments are merely part of the embodiments of the present invention, not all embodiments. Based on the embodiments of the present invention, all other embodiments made by one of ordinary skills in the art without creative labor are within the protection scope of the present invention.

Figure 1:
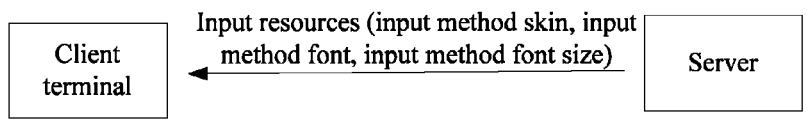
FIG. 1 is a schematic diagram of the system used by the technical solutions provided by the embodiments of the invention.

The system used in the technical solutions provided by embodiments of the present invention is shown in FIG. 1. The system mainly comprises a client terminal and a server, the method and system provided in the embodiments of the present invention are implemented in the server, which is mainly used to send input resources to the client terminal for the client terminal to show the input resources, and to receive input resources selected by the user, so as to achieve replacement of input resources, or for the sake of direct updating of input resources in the client terminal. In the aforementioned method and system, the client terminals can be input method client terminals, including input method client terminals running on any terminals. The terminals may include personal computers (PC), laptops, cell phones, and tablet computers.

Embodiments of the invention present a method for pushing input resources. Let's refer to FIG. 2, which is a schematic flow diagram for a method for pushing input resources provided by an embodiment of the present invention. As shown in the figure, the method comprises steps of:

S201, obtaining user characteristic information in a client terminal, the user characteristic information including user interest information or user position information.

In particular, a server obtains user characteristic information in a client terminal, when the server receives input resource update request sent by the client terminal, it needs to provide updated input resources to the client terminal based on the user characteristic information of the client terminal, or the server maintains an update cycle for each client terminal, the server needs to periodically and actively provide updated input resources to the client terminal based on the user characteristic information of the client terminal.

In the aforementioned step, the user characteristic information may include user-interest information or user position information.

In the aforementioned step, the input resources may include at least one of input method skin, input method font, and input method font size.

In the embodiment of the invention, the method for the server to obtain the user characteristic information of the client terminal may be one of the following two methods:

The first method: when the user characteristic information is user interest information, the method for the server to obtain the user characteristic information is as follows:

First, the server obtains at least one on-screen word entry of the client terminal. In this step, the user inputs Pinyin, the client terminal provides at least one candidate word entry based on the input Pinyin, and then receives one candidate word entry selected by the user, and then the client terminal displays the candidate word entry on screen, which candidate word entry is, de facto, the one-screen word entry. For example, the user inputs a piece of Pinyin "shuru", and selects the Chinese word entry "Input" among the candidate word entries, then the Chinese word entry "Input" is the on-screen word entry. In this way, the client terminal can obtain the user's input log, which includes at least one on-screen word entry and the time each on-screen word entry was displayed on screen. Herein, the on-screen word entries obtained by the client terminal can be the on-screen word entries obtained when the user uses Apps, such as Wechat, Weibo, which are Apps that need to input characters with the client terminal.

The server can receive user input logs reported periodically by the client terminal, so as to obtain at least one on-screen word entry of the client terminal. Alternatively, the server sends a log acquisition request to the client terminal, so that the client terminal, after receiving the log acquisition request, reports a user input log within the most recent time period to the server, in this way, the server can obtain at least one on-screen word entry of the client terminal.

In the above step, when the client terminal provides the user input log to the server, it needs to provide the identifier of the client terminal to the server. The client terminal's identifier can include: international mobile subscriber identifier terminal (IMSI) and Universal Unique identifier (UUID) of the client; the client terminal's identifier may also include: international mobile equipment identifier (IMEI) code and UUID.

Subsequently, the server obtains the word frequency information of the at least one on-screen word entry, based on the at least one on-screen word entry of the client terminal. In the aforementioned step, the server, after obtaining the user input log, can do statistics on the number of times each on-screen word entry of the at least one on-screen word entry is displayed on screen, and then obtains the word frequency information for each on-screen word entry based on the ratio of the number of timings of being displayed on screen to the total number of on-screen word entries. Alternatively, the server, after obtaining the user input log, can do statistics on the number of timings any one on-screen word entry of the at least one on-screen word entry is displayed on screen or the number timings of being displayed on screen for any number of on-screen word entries, rather than do statistics on the number of timings each on-screen word entry of the at least one on-screen word entry is displayed on screen. For example, the on-screen word entry "Attack on Titan" has been displayed on screen for 10 timings, and the total number of the on-screen word entries is 100, the word frequency information for the on-screen word entry "Attack on Titan" is 10%.

Alternatively, if an on-screen word entry and another on-screen word entry can form a new on-screen word entry, it is further necessary to obtain the word frequency information for the new on-screen word entry. Accordingly, the server can traverse the on-screen word entries and combine, in sequence, two adjacent on-screen word entries, so as to obtain a new word entry, and then matching the new word entry in the corpus, if there are a matching word entry, the new word entry can be used as an on-screen word entry. For example, the user respectively enters a "attack on" and "titan", the "attack on" and "titan" are combined to give the word entry "Attack on Titan", and then the "Attack on Titan" is matched in the corpus, if the word entry is found in the corpus, "Attack on Titan" can be used as an on-screen word entry.

Next, the server obtains at least one target word entry based on the at least one on-screen word entry, the word frequency information of each of the at least one on-screen word entry, and a preset frequency threshold. For example, comparison can be done to compare the word frequency information of each on-screen word entry with a preset word frequency threshold, so as to obtain the on-screen word entries whose pieces of word frequency information are greater than the preset frequency threshold. Because the pieces frequency information of these on-screen word entries are greater than the frequency threshold, the on-screen word entries can be consider to be high-frequency word entries. The high-frequency word entries of the on-screen word entries can be taken as the target word entries, so as to obtain at least one target word entry from the at least one on-screen word entry. For example, The word frequency threshold is 5%, the word frequency information of the on-screen word entry "Attack on Titan" is 10%, accordingly, the word frequency information of the on-screen word entry "Attack on Titan" is greater than the word frequency threshold, the on-screen word entry "Attack on Titan" is a high-frequency word entry, the on-screen word entry "Attack on Titan" can be taken as a target word entry.

Finally, the user interest information of the client terminal is obtained according to the at least one target word entry and a preset category dictionary. Herein, the category dictionary includes at least one interest category, and at least one word entry include in each category; for example, the interest categories can include animation, music, law, computers, mathematics, and so on.

In the present embodiment, the method for the server to obtain the user interest information of the client terminal according to at least one target word entry and a preset category dictionary can be:

Matching is carried out among all word entries in the category dictionary according to each target word entry; if there exists a word entry that matches with the target word entry, the corresponding weight value of the interest category the word entry belongs to is increased by 1, that is, if a target word entry hits an interest category, the weight value of the interest category is increased by 1; if there is no word entry that matches with the target word entry, a co-occurring word entry of the target word entry may be obtained based on at least one webpage in a webpage database, the co-occurring word entry may be a word entry that appears along with the target word entry in a web page, it can be a word entry that appears along with the target word entry in a whole paragraph of text, it can also be a word entry that appears along with the target word entry in a sentence; next, statistics is done on the number of co-occurrences of the co-occurring word entry, each time the co-occurring word entry co-occurs with the target word entry, the number of co-occurrences of the co-occurring word entry and the target word entry is increased by 1, the co-occurring word entries are sorted according to the descending order of the numbers of co-occurrence, so as to obtain the co-occurring word entry with the largest number of co-occurrences; matching is carried out among all word entries in the category dictionary according to the co-occurring word entry with the largest number of co-occurrences; if there exists a word entry that matches with the co-occurring word entry, the corresponding weight value of the interest category the word entry belongs to is increased by 1; if there is no word entry that matches with the co-occurring word entry, the target word entry is discarded, and the aforementioned processing is continued with other target word entries until all the target word entries are processed according to the aforementioned process. For example, if matching in the category dictionary based on the target word entry "Attack on Titan" fails, a co-occurring word entry is obtained based on a large number of web pages. For example, in "Attack on Titan is an animation", the "animation" is the co-occurring word entry of the "Attack on Titan". If, based on the statistics on a large number of web pages, it is found that "animation" is the co-occurring word entry of "Attack on Titan" with the largest co-occurrence number, matching is carried out in the category dictionary based on the co-occurring word entry "animation", an interest category "animation" is obtained, the corresponding weight value of the interest category is increased by 1.

In this way, after each target word entry is processed as above, at least one interest category and a weight value for each interest category are obtained. The interest categories are sorted according to the descending order of the weight values. The user interest information of the client terminal is obtained based on at least one interest category with the largest weight value; in other words, one or more interest categories which are ranked near the top are taken as the interest categories that the customer is interested, so as to obtain the user interest information of the client terminal; the correspondence relationship between the client terminal and the user interest information can be further stored, in this way, when it is necessary to push input resources to the client terminal, it is possible to obtain the user interest information of the client terminal based on the client terminal's identifier and the correspondence relationship between the client terminal and the user-interest information, and thus it is possible to push input resources to the client terminal based on user interest information.

The second method: when the user characteristic information is user position information, the method for the server to obtain the user characteristic information is as follows:

First, the server obtains at least one piece of candidate position information of the client terminal. In this step, the client terminal can call an API interface, to obtain the recent positioning records from the positioning terminal of the client terminal, the recent position information and the corresponding positioning timing of the position information are stored in the positioning records; after obtaining the positioning records, the client terminal sends the positioning records to the server, so that the server can obtain the positioning history provided by the client terminal, the position information in the positioning history is taken as the candidate position information, so that the server obtains at least one piece of candidate position information.

Next, the server does statistics on the number of occurrences of the at least one piece of candidate position information based on the at least one piece of candidate position information. Herein, one can do statistics on the number of occurrences for each piece of candidate position information, or one can choose to do statistics on the number of occurrences for a certain number of pieces of candidate position information in the at least one piece of candidate position information, not all the pieces of candidate position information. Herein, the number of occurrences of one piece of candidate position information refers to the total number of the piece of candidate position information in the recent positioning history; for example, in the last month's positioning history, the piece of candidate position information "Paris France" has three different corresponding positioning timings, the number of occurrences of the pieces of candidate position information is 3.

Next, the server obtains at least one piece of target position information based on the at least one piece of candidate position information, the number of occurrences of each piece of the at least one piece of candidate position information, and a preset probability threshold. For each piece of candidate position information, the occurring probability of the piece of candidate position information is obtained based on the ratio of the number of occurrences of each piece of candidate position information to the total number of the pieces of candidate position information. Then the occurring probabilities are respectively compared with the preset probability threshold, so as to obtain the pieces of candidate information with the occurring probabilities greater than the probability threshold. If the occurring probability of a certain piece of candidate position information is greater than the probability threshold, the piece of candidate position information is a piece of high-frequency position information, the piece of high-frequency position information is taken as the piece of target position information in the embodiment of the present invention; if the occurring probability of a piece of candidate position information is less than or equal to the probability threshold, the piece of candidate position information is discarded.

Finally, the user positioning information of the client terminal is obtained based on the at least one piece of target position information, the user position information of the client terminal includes the at least one piece of target position information. Alternatively, the correspondence relationship between the client terminal and the user position information can be further stored, so that when it is necessary to push input resources to the client terminal, it is possible to obtain the user position information of the client terminal based on the client terminal's identifier and the correspondence relationship between the client terminal and the user position information, and thus it is possible to push input resources to the client terminal based on user position information. For example, if recently user A often appears in France, it is possible to obtain the position information of the client terminal used by the user A being France, based on the user position information, input resources associated with France can be recommended to the user, e.g., an input method skin of the Eiffel Tower can be recommended to the user.

As should be noted, because the user's interest or position changes frequently, in the embodiment of the invention, the server can periodically use the above method to obtain the user characteristic information of the client terminal within the last week, so that when it is necessary to recommend input resources to the user, it is possible to obtain the user characteristic information of the client terminal directly based on the client terminal's identifier and the correspondence relationship obtained previously, and thus it is possible to obtain input resources based on the user characteristic information, and finally push the obtained input resources to the client terminal, which can increase the efficiency of pushing input sources and reduce the processing pressure on the server.

S202, obtaining at least one input resource based on the user characteristic information; the input resources including at least one of input method skin, input method font, and input method font size.

Specifically, after obtaining the user characteristic information, the server first obtains at least one candidate input resource associated with the user characteristic information based on the relationship between the user characteristic information and candidate input resources.

If there are too many candidate input resources associated with the user characteristic information, it is necessary to select the input resources to recommend to the user from the candidate input resources. For example, one can randomly select at least one input resource from the at least one candidate input resource. Or, one can obtain at least one input resource from the at least one candidate input resource based on at least one candidate input resource with the most recent update time, namely, select at least one input resource with the most recent update time as the input resource recommended to the client terminal. Or, one can obtain at least one input resource from the at least one candidate input resource based on at least one candidate input resource with the highest user rating, namely, select at least one input resource with the highest user rating as the input resource recommended to the client terminal. Herein, the at least one input resource can be sorted according to the order of the update time from the nearest to the distant past, one or more input resources ranked near the top are the at least one input resource with the nearest update time. Similarly, the at least one input resource can be sorted according to the order of the user rating from the highest to the lowest, one or more input resources ranked near the top are the at least one input resource with the highest user rating.

For example, the user recently discussed a lot on the Internet with his friends about "Attack on Titan", and therefore input the term "Attack on Titan" with the client terminal frequently. Based on the on-screen word entries reported from the client terminal, the server determines that the term "Attack on Titan" is a target word entry, and matches the target word entry in the category dictionary, obtains the interest category "animation", and then increases the weight value of "animation" by 1. If "animation" is user interest information, one can push an input method skin related to animation to the user.

Here, if the obtained at least one input resource is one input resource, the one input resource can be an input method skin, an input method font, or an input method font size; if the obtained at least one input resource is at leas two input resources, the at least two input resources can be both input method skins, both input method fonts, or both input method font sizes, or at least two of an input method skin, an input method font, and an input method font size. For example, three input resources are obtained, which include two input method input skins and one input method font.

S203, pushing the at least one input method resource to the client terminal.

Specifically, after obtaining the at least one input method resource, the server will need to push the at least one put method resource to the client terminal.

In the embodiment of the present invention, pushing the at least one input method resource to the client terminal may include:

First type: If the server obtains one input resource, it pushes the input resource to the client terminal, so that the client terminal can directly update the current input resources of the client terminal based on the input resource. For example, the server sends some display pictures of an input method skin to the client terminal, so that the user can update the display pictures of the current input method skin based on the display pictures of the input method, so as to update the input method skin.

The second type: If the server obtains at least two input resources, the server can output to the client terminal an input resource recommendation window, which displays the display pictures of at least two input resources. In this way, the client terminal can prompt the user whether to replace the input sources, and receive the input resources selected by the user in the recommendation window, and then update the current input resources based on the input resource selected by the user.

Further, embodiments of the invention give the embodiments of the system for implementing the steps and methods in the aforementioned embodiments.

Figure 3:
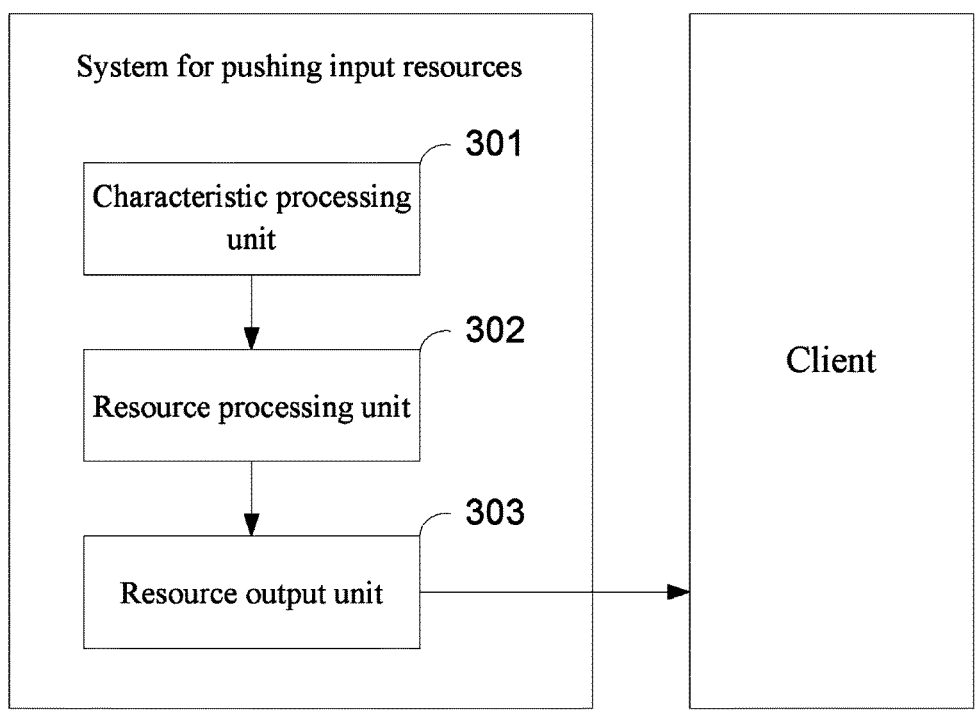
FIG. 3 is a functional block diagram of a system for pushing input resources provided by an embodiment of the present invention.

Let's refer to FIG. 3, which is the functional block diagram of the system for pushing input resources according to the embodiments of the present invention. As shown, the system comprises:

a characteristic processing unit 301, for obtaining user characteristic information in a client terminal, the user characteristic information including user interest information or user position information;

a resource processing unit 302, for obtaining at least one input resource based on the user characteristic information;

the input resources including at least one of input method skin, input method font, and input method font size;

a resource output unit 303, for pushing the at least one input resource to the client terminal.

Herein, if the user characteristic information is user interest information, the characteristic processing unit 301 is specifically used for:

obtaining at least one on-screen word entry of the client terminal;

obtaining the word frequency information of the at least one on-screen word entry;

obtaining at least one target word entry based on the at least one on-screen word entry, the word frequency information of the at least one on-screen word entry, and a preset frequency threshold;

obtaining the user interest information of the client terminal according to at least one target word entry and a preset category dictionary.

Herein, the category dictionary includes at least one interest category and at least one word entry included in each interest category; when obtaining the user interest information of the client terminal according to at least one target word entry and a preset category dictionary, the characteristic processing unit 301 is specifically used for:

carrying out matching among all word entries in the category dictionary according to each target word entry;

if there exists a word entry that matches with the target word entry, increasing the corresponding weight value of the interest category the word entry belongs to by 1; if there is no word entry that matches with the target word entry, obtaining a co-occurring word entry of the target word entry with the largest number of co-occurrences; matching is carried out among all word entries in the category dictionary according to the co-occurring word entry; if there exists a word entry that matches with the co-occurring word entry, the corresponding weight value of the interest category the word entry belongs to is increased by 1;

obtaining user interest information of the client terminal based on at least one interest category with the largest weight value.

Herein, if the user characteristic information is user position information, the characteristic processing unit 301 is specifically used for:

obtaining at least one piece of candidate position information of the client terminal;

obtaining the number of occurrences of the at least one piece of candidate position information;

obtaining at least one piece of target position information based on the at least one piece of candidate position information, the number of occurrences of the at least one piece of candidate position information, and a preset probability threshold.

Obtaining the user positioning information of the client terminal based on the at least one piece of target position information.

Herein, the resource processing unit 302 is specifically used for:

obtaining at least one candidate input resource associated with the user characteristic information;

randomly selecting at least one input resource from the at least one candidate input resource; or obtaining at least one input resource from the at least one candidate input resource based on the most recent update time of the at least one candidate input resource; or, obtaining at least one input resource from the at least one candidate input resource based on at least one candidate input resource with the highest user rating.

Figure 2:
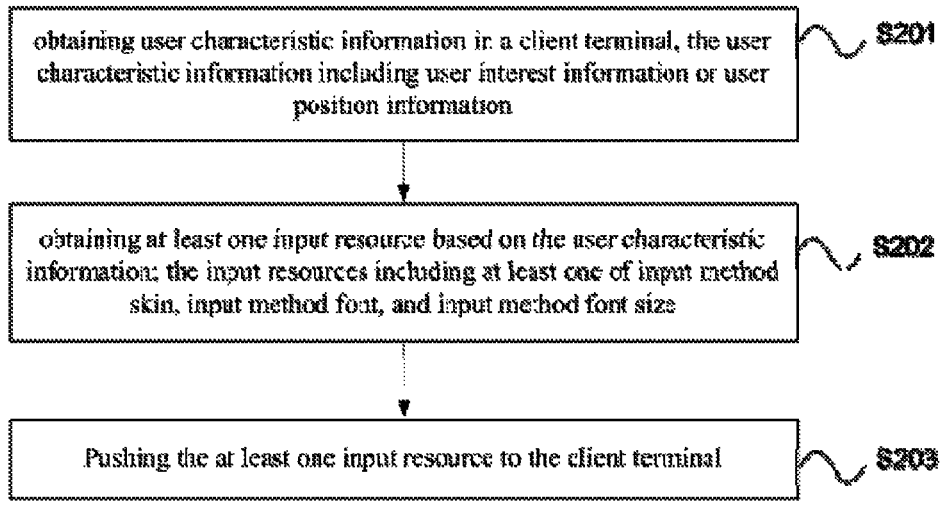
FIG. 2 is a schematic flow diagram of a method for pushing input resources provided by an embodiment of the present invention.

Since the units in the embodiment can perform the method shown in FIG. 2, the part of the present embodiment not described in detail can be described with references to relevant description of FIG. 2.

The technical solutions of the embodiments of the present invention have the following beneficial effects:

It is possible to obtain, based on the obtained user characteristic information such as user interest information or user position information, input resources, such as input method skin, input method font, or input method font size, and then to push the obtained resources to the user. Different from the prior art, the present invention can timely obtain input resources, reduce the cost of system running in the terminal, improve the system efficiency, and make the server to do intelligent pushing of input sources.

In the technical solution provided by the present invention, it should be understood that the systems, devices and methods disclosed may be implemented by other ways. For example, the devices described above are merely illustrative; for example, the division of units is merely division according to logical functions, in actual implementation, the division may be implemented in additional ways.

The units described as separate components may or may not be physically separated, the components shown as units may or may not be physical units, i.e., they can be located in one place, or may be distributed in a plurality of network elements. One can select part of or all of the units based on actual needs to achieve the purpose of the technical solution of the embodiments.

Further, in the embodiment of the present invention, the various functional units can be either integrated in one processing unit, or be located in separate physical places; or two or more units can be integrated into one unit. The aforementioned integrated units can be implemented in the form of hardware, they can also be implemented in the form of hardware plus software functional units.

The aforementioned integrated unit implemented in the form of software functional units may be stored in a computer readable storage medium. The aforementioned software functional units are in a storage medium, including several instructions to instruct a computer device (a personal computer, server, or network equipment, etc.) or processor to perform part of the steps in the method of each embodiment of the present invention. The aforementioned storage medium includes: universal serial bus (USB) flash drives, removable hard disk, Read Only Memory (ROM), random access memory (RAM), magnetic or optical disk, and other media that can store program codes.

The foregoing is only preferred embodiments of the present invention, it is not intended to limit the present invention, any modifications, equivalent substitutions and improvements made within the spirit and principles of the present invention should be included in the present invention within the scope of protection.

I claim:

1. A method for pushing input resources comprising:
   obtaining user characteristic information of a client terminal, the user characteristic information including user interest information or user position information;
   obtaining at least one input resource based on the user characteristic information, the at least one input resource including at least one of input method skin, input method font, and input method font size; and
   pushing the at least one input resource to the client terminal, wherein:

the user characteristic information is user interest information, the step of obtaining user characteristic information in the client terminal comprising:
obtaining at least one on-screen word entry of the client terminal;
obtaining word frequency information of the at least one on-screen word entry;
obtaining at least one target word entry based on the at least one on-screen word entry, the word frequency information of the at least one on-screen word entry, and a preset frequency threshold; and
obtaining the user interest information of the client terminal according to the at least one target word entry and a preset category dictionary, the preset category dictionary includes at least one interest category and at least one word entry included in each interest category, the step of obtaining the user interest information of the client terminal according to the at least one target word entry and the preset category dictionary further comprising:
carrying out matching among all word entries in the preset category dictionary according to each target word entry;
if there exists a word entry that matches with the target word entry, increasing a corresponding weight value of the interest category the word entry belongs to by 1;
if there is no word entry that matches with the target word entry, obtaining a co-occurring word entry of the target word entry with a largest number of co-occurrences;
carrying out matching among all word entries in the preset category dictionary according to the co-occurring word entry with a largest number of co-occurrences;
increasing a corresponding weight value of the interest category the co-occurring word entry belongs to by 1; and
obtaining the user interest information of the client terminal based on at least one interest category with a largest weight value.

2. The method according to claim 1, wherein the user characteristic information is user position information, the step of obtaining user characteristic information in a client terminal comprising:
obtaining at least one piece of candidate position information of the client terminal;
obtaining a number of occurrences of the at least one piece of candidate position information;
obtaining at least one piece of target position information based on the at least one piece of candidate position information, the number of occurrences of the at least one piece of candidate position information, and a preset probability threshold;
obtaining the user position information of the client terminal based on the at least one piece of target position information.

3. The method according to claim 2, wherein the step of obtaining at least one input resource based on the user characteristic information comprises:
obtaining at least one candidate input resource associated with the user characteristic information; and
randomly selecting at least one input resource from the at least one candidate input resource; or, obtaining at least one input resource from the at least one candidate input resource based on at least one candidate input resource with a most recent update time; or, obtaining at least one input resource from the at least one candidate input resource based on at least one candidate input resource with a highest user rating.

4. The method according to claim 1, wherein the step of obtaining at least one input resource based on the user characteristic information comprises:
obtaining at least one candidate input resource associated with the user characteristic information; and
randomly selecting at least one input resource from the at least one candidate input resource; or, obtaining at least one input resource from the at least one candidate input resource based on at least one candidate input resource with a most recent update time; or, obtaining at least one input resource from the at least one candidate input resource based on at least one candidate input resource with a highest user rating.

5. A system for pushing input resources, wherein the system comprises:
one or more processors; and
memory having instructions stored thereon, wherein the instructions, when executed by the one or more processors, cause the one or more processors to control a process, the process comprising:
obtaining user characteristic information of a client terminal, the user characteristic information including user interest information or user position information;
obtaining at least one input resource based on the user characteristic information; the input resources including at least one of input method skin, input method font, and input method font size; and
pushing the at least one input resource to the client terminal, wherein:
the user characteristic information is user interest information, and the process includes:
obtaining at least one on-screen word entry of the client terminal;
obtaining word frequency information of the at least one on-screen word entry;
obtaining at least one target word entry based on the at least one on-screen word entry, the word frequency information of the at least one on-screen word entry, and a preset frequency threshold;
obtaining the user interest information of the client terminal according to the at least one target word entry and a preset category dictionary, the preset category dictionary includes at least one interest category and at least one word entry included in each interest category;
carrying out matching among all word entries in the preset category dictionary according to each target word entry;
if there exists a word entry that matches with the target word entry, increasing a corresponding weight value of the interest category the word entry belongs to by 1;
if there is no word entry that matches with the target word entry, obtaining a co-occurring word entry of the target word entry with a largest number of co-occurrences;
carrying out matching among all word entries in the preset category dictionary according to the co-occurring word entry;
increasing a corresponding weight value of the interest category the co-occurring word entry belongs to by 1; and obtaining the user interest information of the client terminal based on at least one interest category with a largest weight value.

6. The system according to claim 5, wherein the user characteristic information is user position information, and the obtaining user characteristic information comprises:
   obtaining at least one piece of candidate position information of the client terminal;
   obtaining a number of occurrences of the at least one piece of candidate position information;
   obtaining at least one piece of target position information based on the at least one piece of candidate position information, the number of occurrences of the at least one piece of candidate position information, and a preset probability threshold; and
   obtaining the user positioning information of the client terminal based on the at least one piece of target position information.

7. The system according to claim 6, wherein the obtaining at least one input resource based on the user characteristic information comprises:
   obtaining at least one candidate input resource associated with the user characteristic information; and
   randomly selecting at least one input resource from the at least one candidate input resource; or, obtaining at least one input resource from the at least one candidate input resource based on at least one candidate input resource with a most recent update time; or, obtaining at least one input resource from the at least one candidate input resource based on at least one candidate input resource with a highest user rating.

8. The system according to claim 5, wherein the obtaining at least one input resource based on user characteristic information comprises:
   obtaining at least one candidate input resource associated with the user characteristic information; and
   randomly selecting at least one input resource from the at least one candidate input resource; or, obtaining at least one input resource from the at least one candidate input resource based on at least one candidate input resource with a most recent update time; or, obtaining at least one input resource from the at least one candidate input resource based on at least one candidate input resource with a highest user rating.

9. A non-transitory computer-readable storage medium in which one or more programs are stored, wherein the one or more programs, when executed by an apparatus, enable the apparatus to perform a method, the method comprising:
   obtaining user characteristic information of a client terminal, the user characteristic information including user interest information or user position information;
   obtaining at least one input resource based on the user characteristic information, the at least one input resource including at least one of input method skin, input method font, and input method font size; and
   pushing the at least one input resource to the client terminal, wherein:
   the user characteristic information is user interest information, the step of obtaining user characteristic information in the client terminal comprising:
   obtaining at least one on-screen word entry of the client terminal;
   obtaining word frequency information of the at least one on-screen word entry;
   obtaining at least one target word entry based on the at least one on-screen word entry, the word frequency information of the at least one on-screen word entry, and a preset frequency threshold; and
   obtaining the user interest information of the client terminal according to the at least one target word entry and a preset category dictionary, the preset category dictionary includes at least one interest category and at least one word entry included in each interest category, the step of obtaining the user interest information of the client terminal according to the at least one target word entry and the preset category dictionary further comprising:
   carrying out matching among all word entries in the preset category dictionary according to each target word entry;
   if there exists a word entry that matches with the target word entry, increasing a corresponding weight value of the interest category the word entry belongs to by 1;
   if there is no word entry that matches with the target word entry, obtaining a co-occurring word entry of the target word entry with a largest number of co-occurrences;
   carrying out matching among all word entries in the preset category dictionary according to the co-occurring word entry with a largest number of co-occurrences;
   increasing a corresponding weight value of the interest category the co-occurring word entry belongs to by 1; and
   obtaining the user interest information of the client terminal based on at least one interest category with a largest weight value.

10. The non-transitory computer-readable medium according to claim 9, wherein the user characteristic information is user position information, the operation of obtaining user characteristic information in a client terminal comprising:
    obtaining at least one piece of candidate position information of the client terminal;
    obtaining a number of occurrences of the at least one piece of candidate position information;
    obtaining at least one piece of target position information based on the at least one piece of candidate position information, the number of occurrences of the at least one piece of candidate position information, and a preset probability threshold; and
    obtaining the user position information of the client terminal based on the at least one piece of target position information.

11. The non-transitory computer-readable medium according to claim 9, wherein the obtaining at least one input resource based on the user characteristic information comprises:
    obtaining at least one candidate input resource associated with the user characteristic information; and
    randomly selecting at least one input resource from the at least one candidate input resource; or, obtaining at least one input resource from the at least one candidate input resource based on at least one candidate input resource with a most recent update time; or, obtaining at least one input resource from the at least one candidate input resource based on at least one candidate input resource with a highest user rating.

12. The non-transitory computer-readable medium according to claim 10, wherein the obtaining at least one input resource based on the user characteristic information comprises:
    obtaining at least one candidate input resource associated with the user characteristic information; and randomly selecting at least one input resource from the at least one candidate input resource; or, obtaining at least one input resource from the at least one candidate input resource based on at least one candidate input resource with a most recent update time; or, obtaining at least one input resource from the at least one candidate input resource based on at least one candidate input resource with a highest user rating.

\* \* \* \* \*